United States Patent [19]
Bonicel et al.

[11] Patent Number: 5,379,363
[45] Date of Patent: Jan. 3, 1995

[54] TAPE OF INDIVIDUALIZED OPTICAL FIBERS

[75] Inventors: Jean-Pierre Bonicel, Lyons; Pierre Giraud, Caluire, both of France

[73] Assignee: Alcatel Cable, Clichy Cedex, France

[21] Appl. No.: 99,551

[22] Filed: Jul. 30, 1993

[30] Foreign Application Priority Data

Jul. 31, 1992 [FR] France .................. 92 09541

[51] Int. Cl.⁶ .................................................. G02B 6/44
[52] U.S. Cl. ...................................... 385/114; 385/100; 385/128; 385/147
[58] Field of Search ............... 385/100, 101, 102–114, 385/115, 121, 126, 127, 128, 147

[56] References Cited

U.S. PATENT DOCUMENTS

| | | | |
|---|---|---|---|
| 2,992,292 | 7/1961 | Brown | 174/112 |
| 3,728,422 | 4/1973 | Sugaya | 385/114 X |
| 4,153,332 | 5/1979 | Longoni | 385/111 |
| 4,279,470 | 7/1981 | Portinari et al. | 385/111 |
| 4,629,284 | 12/1986 | Malavieille | 385/70 |
| 4,629,285 | 12/1986 | Carter et al. | 385/128 |
| 4,900,126 | 2/1990 | Jackson et al. | 385/114 |
| 4,960,318 | 10/1990 | Nilsson et al. | 385/103 |
| 5,042,904 | 8/1991 | Story et al. | 385/105 |
| 5,076,881 | 12/1991 | Ferguson | 156/436 |
| 5,082,347 | 1/1992 | Akasaka et al. | 385/114 |

FOREIGN PATENT DOCUMENTS

| | | | |
|---|---|---|---|
| 3208172A1 | 9/1983 | Germany | G02B 5/16 |
| 3427835A1 | 2/1986 | Germany | G02B 6/02 |
| 3637159A1 | 5/1988 | Germany | G02B 6/10 |
| 2109581A | 6/1983 | United Kingdom | G02B 5/14 |
| 2142280A | 1/1985 | United Kingdom | G02B 5/16 |

Primary Examiner—Frank Gonzalez
Attorney, Agent, or Firm—Sughrue, Mion, Zinn, Macpeak & Seas

[57] ABSTRACT

The protected and individualized fibers of the optical fiber ribbon are encapsulated in a common outside covering. The protected fibers carry distinctive sets of ink marks on their outside surfaces in order to individualize them, and they are individually covered with respective films of transparent polymerizable resin containing an anti-adhesive agent, with the common covering being received on the films. The ribbon is suitable for optical fiber cables.

2 Claims, 1 Drawing Sheet

TAPE OF INDIVIDUALIZED OPTICAL FIBERS

The present invention relates to identifying optical fibers encapsulated in a common covering and then referred to as a "tape" or a "ribbon". The invention relates more particularly to a tape structure for individualized optical fibers, the tape itself advantageously being individualized also.

BACKGROUND OF THE INVENTION

Several solutions have already been proposed for individualizing optical fibers in order to enable them to be identified in a ribbon or even in a bundle of fibers that are independent from one another.

In the summary of document JP-A-57040203 as published in the WPI database, an optical fiber is protected by an individualized colored primary covering and by a transparent secondary covering. In particular, the primary covering may be made of colored epoxy resin. The secondary covering includes an inside cushioning layer, in particular of transparent silicone resin, and an outside layer, in particular of transparent nylon.

The primary coverings of the various fibers are colored differently by using different dyes in the epoxy resin. Fibers differently colored in this way can be assembled together as a ribbon and they are then covered with a common cushioning layer and the above-mentioned outside layer of secondary covering. For splicing operations, the outside layer and the cushioning layer of the secondary covering are removed and the primary covering is itself eliminated by means of solvent-impregnated gauze.

That technique of individualizing fibers by coloring their primary coverings can pose problems when making the colored primary covering. An effect of adding the dye is to change the polymerization rate of dye-free or "natural" epoxy resin. The rate is slowed down, but above all it varies as a function of the color and of the uniformity of the various dyes. Consequently, the quality of polymerization becomes difficult to control. As a result it often happens that individualized fibers separate badly from the ribbon and/or that the fibers are badly stripped when it is necessary to perform a splicing operation, with this being due essentially to differences in the polymerization quality of the colored coverings which can cause traces or particles of colored matter be retained on some of the fibers.

In addition, the presence of dye in the primary covering, in particular when the dye is opaque and thus absorbent, can make it impossible during splicing operations to use local injection and detection systems with such fibers since such systems inject light into one of the fibers through its primary covering and transmitted light is similarly detected through the primary covering.

Document GB-A-2 109 581 teaches individualizing fibers that have been previously been protected by a primary covering and preferably also by a secondary covering by means of a colored ink coating the outside surfaces of the protected fibers. This is done when making a cable that is to include the fibers by causing each of the fibers to pass through an inking station prior to the fiber being installed in the cable. The ink used is chosen to have good covering properties and to be quick-drying.

Document FR-A-2 549 238 also relates to individualizing optical fibers. According to document, the outside surfaces of fibers that have already been protected are colored continuously by applying a colored outside layer on each of them, the dyes in said outside layer differing from one fiber another, and annular ink marks are also made one,he colored outside layer. The ink is in a color that contrasts with the possible colors for the colored outside layer, and may be black, for example.

The solutions known from the two last-mentioned documents enable fibers to be individualized when they are left independent of one another. Problems linked to a structure comprising a ribbon of fibers are not raised and are therefore not dealt with.

OBJECTS AND SUMMARY OF THE INVENTION

An object of the present invention is to enable optical fibers assembled in a ribbon to be individualized in a manner that is easy to perform and to detect, while avoiding the above problems that may stem jointly from the way in which individualization is performed and from the ribbon structure. Another object is to enable a ribbon to be identified from amongst other, analogous ribbons.

The present invention provides a ribbon of individualized optical fibers in which the protected and individualized fibers are encapsulated side by side in a common outside covering, wherein said protected fibers carry sets of annular ink marks on their outside surfaces, said sets of marks being identical to one another on a given protected fiber but differing from one protected fiber to another, being representative of the rank of each fiber in question within the ribbon, and serving to individualize said fibers, and wherein the fibers marked in this way further include a transparent film containing an anti-adhesive agent and coating each of the fibers, the common outside covering being received on said film.

The ribbon of the invention preferably has at least one of the following features:
- the sets of marks are at substantially the same marking pitch on all of the fibers, are disposed substantially adjacent to one another, and each set includes a number of marks representative of the rank of the corresponding fiber in the ribbon;
- said ink marks are thin, being 0.1 microns to a few microns thick, and preferably being less than 5 microns thick;
- said film is made of a UV-polymerizable resin and is thin, being a few microns thick, and preferably less than 5 microns thick; and
- the ribbon includes surface identifying ink marks on said common outside covering representing a number given to said ribbon within a set of identical ribbons.

BRIEF DESCRIPTION OF THE DRAWING

The characteristics and advantages of the invention appear from the following description made with reference to the accompanying drawing. In the drawing.

MORE DETAILED DESCRIPTION

Figure 1:
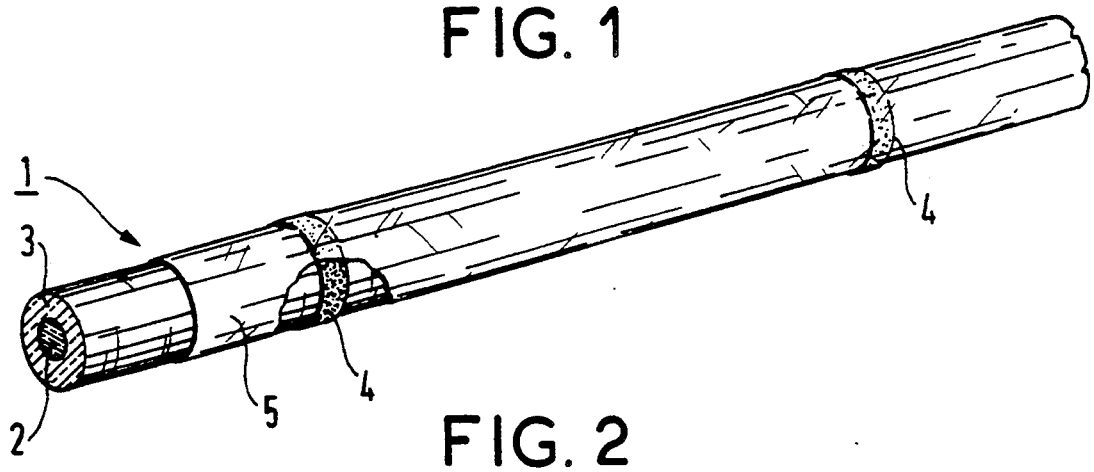
FIG. 1 is a fragmentary perspective view of a fiber individualized in accordance with the invention.

The optical fiber 1 shown in FIG. 1 has a central optical portion 2 constituted by the core and its optical cladding (not shown separately), and a protective outer portion 3 constituted by a primary covering and preferably also a secondary covering (not shown separately). At this stage, the protected fiber has no individualization, and in particular no bulk coloring in any of its outer protective portion. It is individualized by a series of sets of annular ink marks 4 referred to as ink rings. The marking may be done continuously along the length of the fiber, or otherwise. Each set of rings on the fiber 1 is constituted in this example by a single ring. The fiber 1 marked in this way is coated in a fine transparent film 5 of resin.

The ink rings 4 are made by an ink jet using an ink that is selected for low viscosity, and suitable for being applied as a thin film, and in particular being of a dark color such as black which contrasts with the protected fiber. The rings are radially very thin being of thickness lying in the range 0.1 microns to a few microns, and preferably not exceeding 5 microns in to avoid forming microcurvature on either side of the rings. The ink is used with a solvent and/or may be UV-polymerizable.

The fine coating film 5 is itself very thin, being a few microns thick and preferably less than 5 microns thick. It is made of a UV-polymerizable transparent resin. The resin contains an anti-adhesive agent to facilitate assembly of the fiber 1 with other fibers to make up a ribbon. The resin is based in particular on an acrylic or a methacrylic polymer. The anti-adhesive agent it contains remains stable over time and is constituted, in particular, by a carboxylic compound. The fine film protects the individualizing rings on the surface of the protected fiber.

Figure 2:
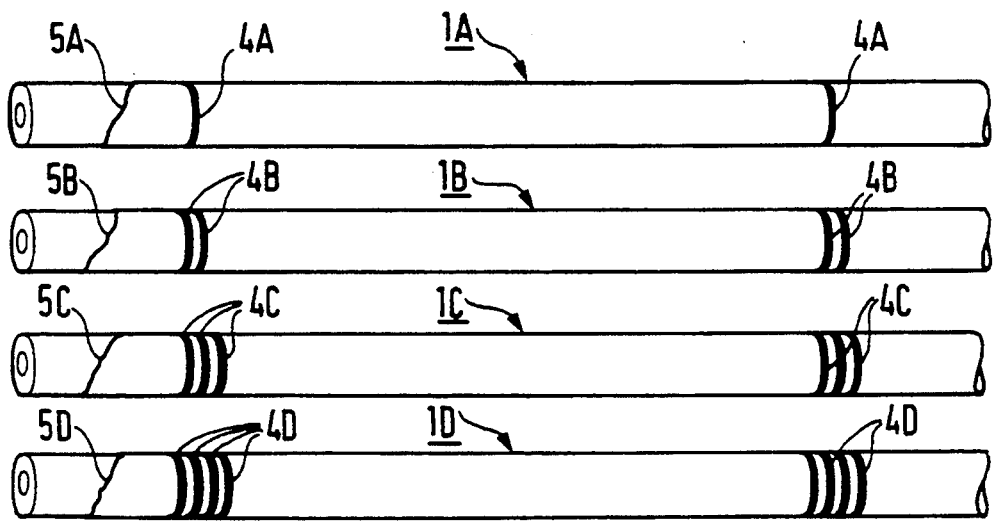
FIG. 2 is a diagrammatic view of a plurality of optical fibers individualized in accordance with the invention.

FIG. 2 shows four individualized fibers referenced 1A to 1D by analogy with the fiber 1 of FIG. 1. The fibers are similar to one another except for the sets of ink rings 4A to 4D with which they are marked. The fibers marked in this way are individually coated by respective final films referenced 5A to 5D.

The fiber 1A is identical to above-described fiber 1, with its sets of rings 4A being the same as the above-described sets of rings 4. The fiber 1B has sets of rings 4B with two rings each, the fiber 1C has three-ring sets 4C and the fiber 1D has four-ring sets 4D. The sets of rings on the same fiber are identical and they differ merely from one fiber to another. They are preferably at the same marking pitch so that the sets of rings come substantially level with one another once the fibers have been assembled together. The spacing between the rings in a given set is small compared with the marking pitch for successive sets.

These sets of ink rings having different numbers of rings from one fiber to another make it easy to identify the various fibers. The number of rings in each set may be representative, in particular, of the rank of the fiber concerned once the various fibers have been assembled side by side in a ribbon structure.

Figure 3:
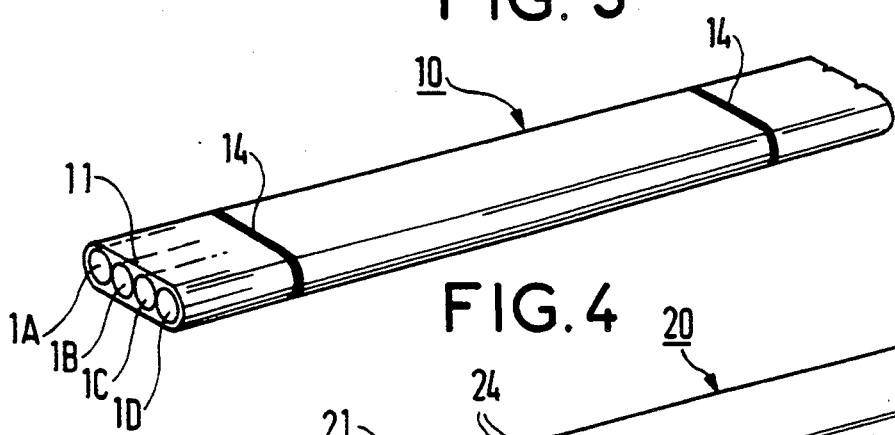
FIGS. 3 and 4 show two ribbons of optical fibers of the invention, each ribbon being individualized.
Figure 4:
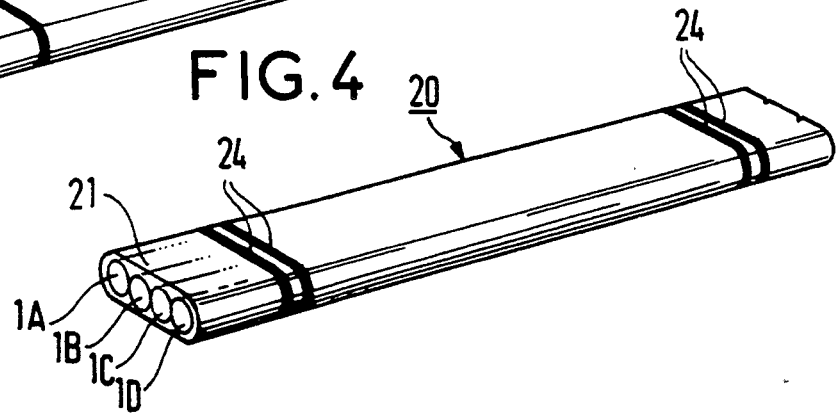

FIGS. 3 and 4 show two ribbons 10 and 20 each comprising four individualized fibers that are identical to the fibers 1A to 1D, and that are given the same references. Naturally, the two ribbons could have some other number of fibers each. The individualized fibers coated in their fine films are encapsulated in a common outside covering 11 or 21 depending on the ribbon in question. The common outside covering is preferably transparent or semitransparent. It is similar in nature to the films coating the individual fibers, but it does not include an anti-adhesive agent. It too carries individualizing marks 14 or 24, depending on the ribbon.

The marks 14 or 24, depending on the ribbon, are similarly surface ink marks made by an ink jet on the ribbon so as to obtain sets of bars or of annular elements. The number of marks in each set is the same on a given ribbon but differs from one ribbon to another. It represents a number given to the ribbon in question within a cable that comprises a plurality of such ribbons and/or additional information relating to the ribbon.

This technique for individualizing fibers and ribbons themselves makes the ribbons easily identifiable like their individual fibers. It can be implemented quickly and easily. It has no effect on the rate and the quality of the polymerization of the resin in the common covering of the ribbon or in the primary and secondary coverings of the fibers since the resin is left in its natural state, and as a result the fibers assembled together in the ribbon can be separated properly. In addition, it does not constitute an obstacle to using local injection and detection systems in which light is injected and detected through the coverings that protect the fibers. Furthermore, this individualization technique is considerably cheaper than that performed by bulk coloring of one of the coverings.

We claim:

1. A ribbon of individualized optical fibers in which the protected and individualized fibers are encapsulated side by side in a common outside covering; wherein said protected fibers carry sets of annular ink marks on their outside surfaces; said sets of marks being identical to one another on a given protected fiber but differing from one protected fiber to another, being representative of the rank of each fiber in question within the ribbon, and serving to individualize said fibers; wherein the fibers marked in this way further include a transparent film containing an anti-adhesive agent and coating each of the fibers, the common outside covering being received on said film; wherein said film coating each marked fiber is made of a UV-polymerizable resin that is thin, being about 5 microns thick; and wherein said common outside covering is made of a transparent UV-polymerizable resin.

2. An optical fiber ribbon according to claim 1, wherein the anti-adhesive agent contained in said resin is a carboxylic compound.

* * * * *